(12) United States Patent
Vollmer et al.

(10) Patent No.: US 7,742,898 B2
(45) Date of Patent: Jun. 22, 2010

(54) METHOD FOR TREATING A DEFECTIVE DEVICE IN A VEHICLE COMMUNICATIONS NETWORK

(75) Inventors: Vasco Vollmer, Holle (DE); Matthias Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1915 days.

(21) Appl. No.: 10/297,235

(22) PCT Filed: Apr. 24, 2001

(86) PCT No.: PCT/DE01/01541

§ 371 (c)(1), (2), (4) Date: Sep. 25, 2003

(87) PCT Pub. No.: WO01/92045

PCT Pub. Date: Dec. 6, 2001

(65) Prior Publication Data
US 2004/0052208 A1 Mar. 18, 2004

(30) Foreign Application Priority Data
Jun. 2, 2000 (DE) .............................. 100 27 362

(51) Int. Cl.
*G06F 11/30* (2006.01)
(52) U.S. Cl. ..................................... 702/185
(58) Field of Classification Search ............ 702/1, 702/32, 34, 35, 42, 59, 85, 90, 104, 108, 702/127, 182, 183, 184, 185; 701/29, 30, 701/31, 34, 39, 62, 63, 76, 97
See application file for complete search history.

(56) References Cited

U.S. PATENT DOCUMENTS

| 4,926,352 | A | * | 5/1990 | Staffe ........................... 701/99 |
| 5,408,412 | A | * | 4/1995 | Hogg et al. .................... 701/33 |
| 5,633,857 | A | | 5/1997 | Kim et al. |
| 6,975,936 | B2 | * | 12/2005 | Akuzawa et al. ............. 701/114 |

FOREIGN PATENT DOCUMENTS

| DE | 41 13 759 | 11/1992 |
| DE | 198 33 462 | 1/2000 |

OTHER PUBLICATIONS

Patent Abstracts of Japan vol. 015, No. 292 (P-1230), Jul. 24, 1991 & JP 03 100836 A (NEC CORP), Apr. 25, 1991.
Patent Abstracts of Japan vol. 1996, No. 04, Apr. 30, 1996 & JP 07 325730 A (Fuji Xerox Co Ltd), Dec. 12, 1995.

* cited by examiner

*Primary Examiner*—Aditya Bhat
(74) *Attorney, Agent, or Firm*—Kenyon & Kenyon LLP

(57) ABSTRACT

A method for handling a faulty device in a vehicle communication network is provided, which is used to identify devices that are either faulty, were removed from the vehicle communication network or were switched off, and to automatically initiate a fault-remedying measure. An expanded, device-specific driver having diagnostic functions is loaded by another device of the network to send a test signal to the faulty device. Either the faulty device is restarted or the faulty device is switched off depending on the reaction to the test signal. If a device is removed from the network, this is indicated in a database. A bus manager will inform other devices connected to the network that this device was removed from the network. Due to a classification of the individual devices connected to the network, not every device is able to perform the fault handling, but rather only suitably classified devices. Misuse is thereby prevented.

7 Claims, 3 Drawing Sheets

METHOD FOR TREATING A DEFECTIVE DEVICE IN A VEHICLE COMMUNICATIONS NETWORK

RELATED APPLICATION INFORMATION

The present application claims priority to and the benefit of German patent application no. 10027362.9, which was filed in Germany on Jun. 2, 2000, and which was filed as PCT/DE01/01541 on Apr. 24, 2001 in the United States, the disclosures of which are incorporated herein by reference.

FIELD OF THE INVENTION

The present invention relates to a method for handling a faulty device in a vehicle communication network.

BACKGROUND INFORMATION

Vehicle communication networks are used in motor vehicles, wherein individual devices which are connected to the vehicle communication network are controlled by drivers for these individual devices. The drivers are managed in a database.

SUMMARY

In contrast, the method of the present invention for handling a faulty device in a vehicle communication network, wherein an automated fault handling sets in when a device becomes defective, is switched off or is removed from the vehicle communication network. This prevents disturbing the operation of the vehicle communication network. A fault-remedying measure appropriate to the faulty device is initiated by the systematized procedure.

When the faulty device does not respond to a test signal, this test signal is sent at least one more time, and if the faulty device again shows no reaction, the faulty device is removed from the vehicle communication network by altering an entry in the database of the vehicle communication network for the faulty device in the manner that this faulty device is marked as removed. A signal is then optionally also sent to the faulty device, such that it switches itself off. This further development prevents it being checked with great probability, whether or not the device is still capable of responding to the test signal. If it is not capable, then the vehicle communication network is able to perform no other automatic fault-handling other than to switch off the faulty device.

Moreover, when the faulty device responds to the test signal with an error code, a restart of the faulty device is forced, and after the restart, the test signal is sent once more, and if the error code is again sent by the faulty device as reaction to the test signal, then the faulty device is switched off. This permits an automated fault handling, attempt being made to remove the fault by restarting the device recognized as faulty. If this does not help, then this device is removed from the vehicle communication network in the manner described above.

The bus manager may inform the other devices connected to the vehicle communication network that the faulty device was removed from the vehicle communication network. This rules out the other devices from attempting to access the removed and faulty device. Malfunctions and unnecessary data traffic on the vehicle communication network are thereby avoided.

In this context, the bus manager is installed on a device of the vehicle communication network, this device also optionally being able to take over other functions besides the bus manager.

Furthermore, the individual devices connected to the vehicle communication network may be classified. This classification complies with a sensitivity level which controls access to other devices. In this context, it is distinguished whether a device is permitted to load drivers, whether a device is permitted to load device-specific and expanded drivers, and whether a device can moreover use the drivers to handle a fault. An unauthorized access to devices is thereby prevented. In particular, this must be seen in light of access to the communication network from outside. A vehicle communication network may have a radio interface which permits access from outside. The classification prevents a device, which accesses the communication network from outside via the radio interface, from not having a sensitivity level that permits fault handling. The access for a device connected to the vehicle communication network from outside may also be restricted by the classification.

Moreover, it is advantageous that devices are present which are able to perform the fault handling according to the invention, and that a device emits an error code if it is also supposed to react to a test signal and has determined an error of its own.

DETAILED DESCRIPTION

In the motor vehicle industry, multimedia components are increasingly being integrated into a vehicle. In so doing, the multimedia components are frequently interconnected via a bas, thus, a vehicle communication network. By the use of drivers for controlling devices which are connected to the vehicle communication network, it is possible that some devices that control other devices either have these drivers themselves or load them from a database if necessary. It is thereby possible to construct vehicle communication networks of variable complexity. If, at this point, a device of the vehicle communication network fails, or it is physically removed from the vehicle communication network or is switched off, then it must be ensured that the operation of the vehicle communication network continues to run normally.

Therefore, according to the invention, a method is put forward with which it is possible to react to faulty behavior of a device of the vehicle communication network. By the use of an expanded, device-specific driver having diagnostic functions for a faulty device, it is determined which fault-remedying measure must be initiated in each case. Fault-remedying measures according to the invention are switching off the device or restarting the faulty device. If a device was removed physically from the vehicle communication network, then solely the entry for this removed device is erased from the database. Thus, in this case, there is no fault-remedying measure, rather only an adjustment of the database entries. The bus manager of the vehicle communication network informs the other devices of the vehicle communication network about the removal of a device. Due to a classification of the individual devices of the vehicle communication network, it is possible that only specific devices are able to load the expanded, device-specific driver having diagnostic functions in order to carry out the fault handling for the faulty device.

Figure 1:
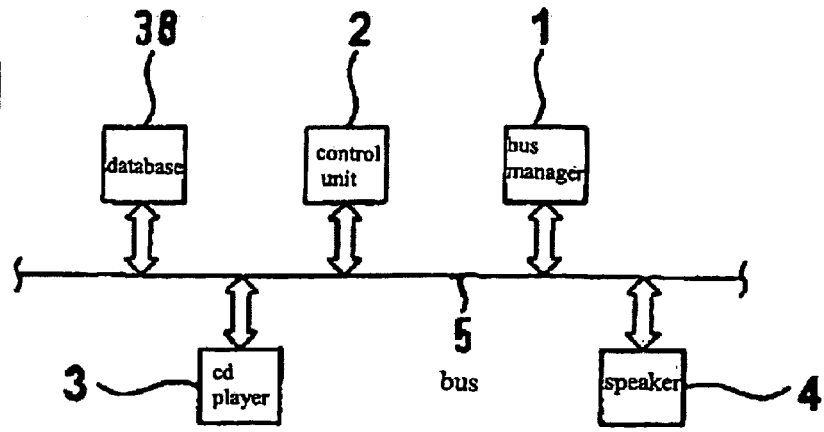
FIG. 1 is a schematic view of a vehicle communication network.

FIG. 1 illustrates a vehicle communication network as a block diagram. A bus manager 1 is connected via a data input/output to a first data input/output of a control unit 2. A second data input/output of control unit 2 is linked to a bus 5. A CD player 3 and a loudspeaker with audio amplifier 4 are in each case linked via data inputs/outputs to bus 5. All devices have bus controllers in order to transmit data via bus 5. Alternatively, it is possible for more devices to be linked to bus 5. Bus 5 here is a multimedia bus which, for example, may be the MOST (MOS transistor) bus.

Figure 2:
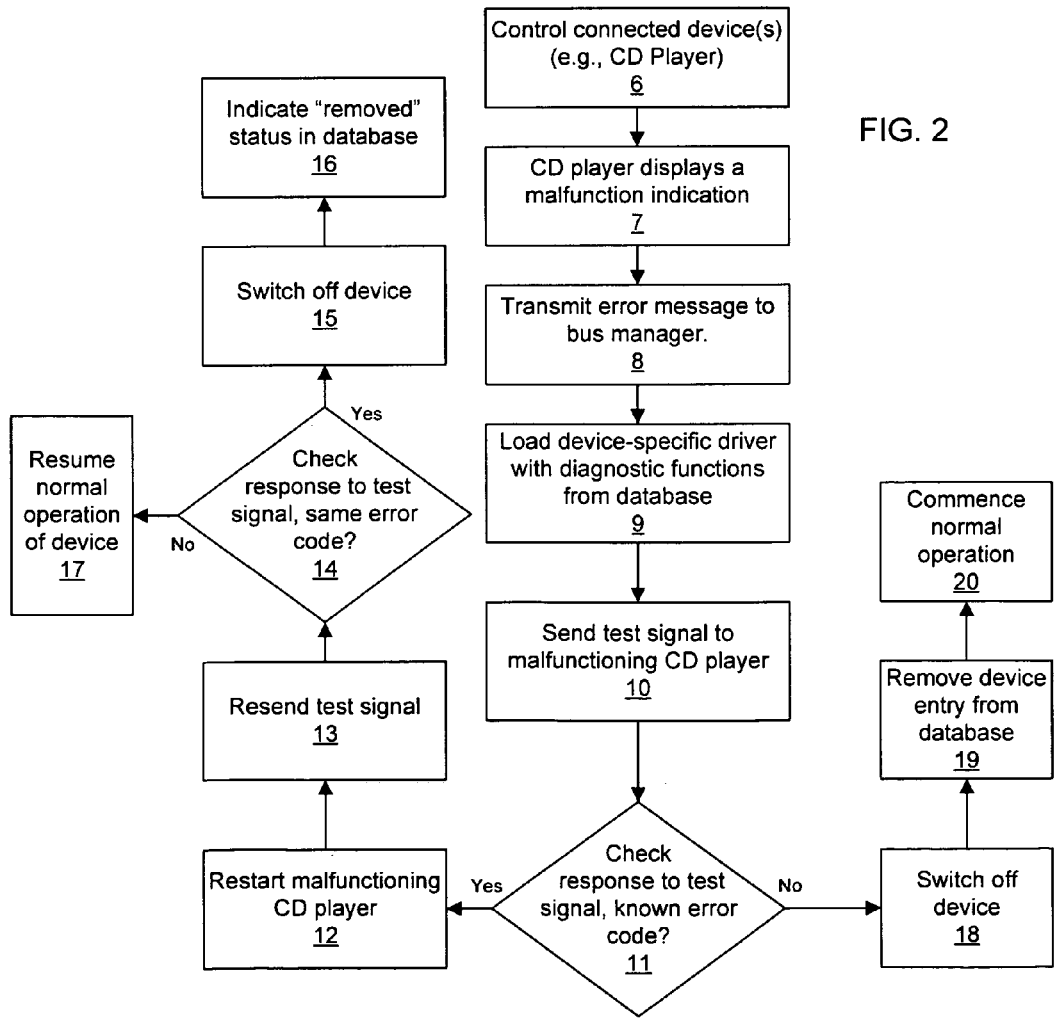
FIG. 2 is a method flowchart for handling a faulty device in a vehicle communication network.

In FIG. 2, the method of the present invention for handling a faulty device in a vehicle communication network is illustrated as a flowchart. In method step 6, control unit 2 controls CD player 3 and loudspeaker with audio amplifier 4. Control unit 2 is activated by the driver or a passenger via an input device in order to cause CD player 3 to play a compact disc. To that end, control unit 2 has a driver for controlling CD player 3. The driver has all functionalities which are possible with CD player 3. Among them are the playback of individual titles, storage of a group of titles which may then be played back, pause, replay or a random playback of titles one after the other. In addition, mechanical functions are also controllable by control unit 2, such as the insertion and ejection of the compact disc. CD player 3 has a driver to control the loudspeaker with audio amplifier 4. The replay of the digital audio data which are loaded from the compact disc is thereby made possible.

In method step 7, CD player 3 now illustrates a malfunction, in that it no longer reacts to a control signal from control unit 2. For example, such a control signal causes the title having the track number 3 to be played back from the inserted CD.

In method step 8, control unit 2 recognizes this and transmits an error message to bus manager 1. Bus manager 1 thereupon loads from database 38 an expanded, device-specific driver for CD player 3 having diagnostic functions. This is performed in method step 9. Therefore, bus manager 1 handles the fault. Alternatively, it is also possible for control unit 2 or another unit which is linked to bus 5 as the vehicle communication network to handle the fault.

In method step 10, with the aid of the expanded, device-specific driver having diagnostic functions, bus manager 1 generates a test signal which it sends to CD player 3. In method step 11, the response to this test signal by CD player 3 is checked. If it is a known error code which CD player 3 sends back to bus manager 1, then in method step 12, CD player 3 is restarted. Bus manager 1 brings this about by a known command which is transmitted via bus 5. In method step 13, the test signal is then sent again by bus manager 1 to CD player 3. In method step 14, the response to the repeated sending of the test signal is evaluated. If the error code is again sent by CD player 3 to bus manager 1 as response to the test signal, then in method step 15, CD player 3 is switched off by a corresponding command. In method step 16, the entry for CD player 3 is entered as removed in database 38. Bus manager 1 then sends a message in broadcast mode to all devices connected to bus 5, with the communication that CD player 3 was removed from bus 5.

If it was established in method step 14 that CD player 3 did not respond with an error code to the test signal, then normal operation is commenced again in method step 17. Consequently, control unit 2 is then able to control CD player 3 once more. Bus manager 1 then erases the expanded, device-specific driver in order to keep its resources free. However, normal operation is only commenced in method step 17 if CD player 3 responds to the test signal with a correct code. If CD player 3 does not respond at all, then in method step 17, CD player 3 is switched off, if this is possible. If this is not the case, then it must be assumed that CD player 3 was removed from vehicle communication network 5. The switch-off is then also communicated by bus manager 1 to all other devices, and the corresponding entry for CD player 3 is marked as removed in database 38.

If it was established in method step 11 that CD player 3 did not respond with an error code to the test signal, then no error exists which can be corrected by a restart. Therefore, in method step 18, the message is sent by bus manager 1 to CD player 3 to switch off the device, in order then in method step 19 to mark the entry for CD player 3 as removed in database 38. In method step 20, normal operation is commenced, bus manager 1 informing all other devices that CD player 3 is no longer connected to bus 5. If CD player 3 does not respond to the test signal, then it is also possible that CD player 3 was already removed from bus 5. Since the reaction to the switch-off signal from bus manager 1 to CD player 3 is not checked, this case is also covered here. Either CD player 3 is switched off according to method step 18, or it is already switched off. The result is the same.

Figure 3:
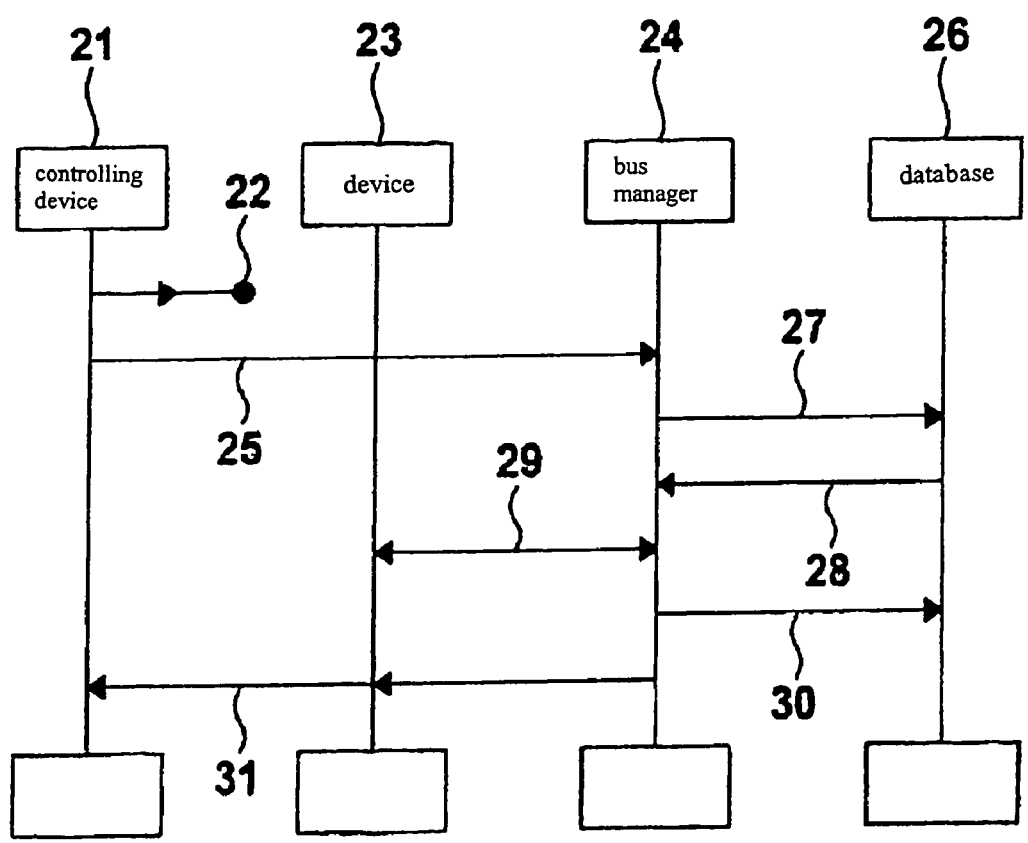
FIG. 3 is a fault handling flowchart for the bus manager.

In FIG. 3, the fault handling by bus manager 1 is represented as a chronological sequence of transmitted messages. A controlling device 21, like control unit 2 described above, sends a message 22 to device 23 to be controlled, CD player 3. Device 23 to be controlled does not respond to message 22. Therefore, an error message 25 is sent by controlling device 21 to bus manager 24. Bus manager 24, to which the device code of device 23 to be controlled was transmitted together with error message 25, thereupon requests of database 26, using message 27, the expanded, device-specific driver having diagnostic functions for device 23. With message 28, this driver is transmitted from database 26 to bus manager 24. In step 29, bus manager 24 performs the fault handling presented above. With message 30, bus manager 24 transmits to database 26 the error report by which database 26 optionally marks device 23 to be controlled as removed. With message 31, bus manager 24 then sends to all other devices connected to the vehicle communication network the message that device 23 was removed or that normal operation has commenced again.

Figure 4:
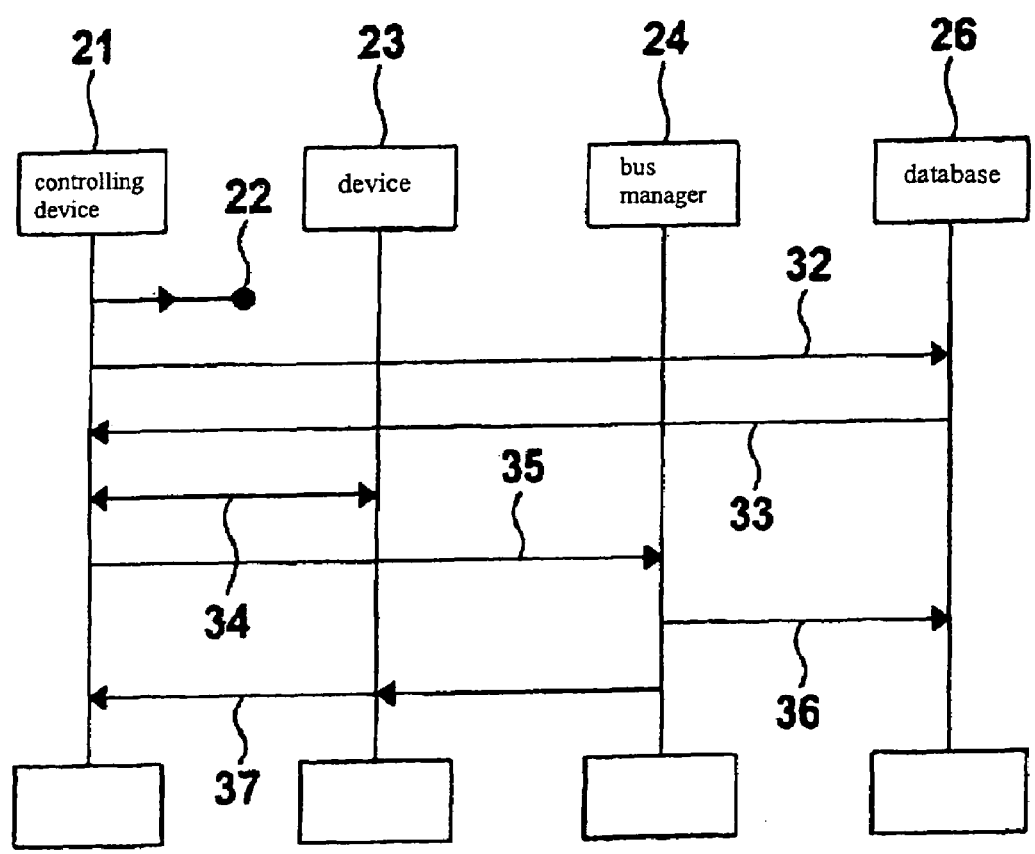
FIG. 4 is a fault handling flowchart for any device of the vehicle communication network which is not the bus manager.

FIG. 4 illustrates how controlling device 21 itself handles the fault. The controlling device again sends message 22, to which device 23 to be controlled does not react. The device to be controlled thereupon requests from database 26 the expanded driver having diagnostic functions for device 23 to be controlled. With message 33, exactly this driver is transmitted from database 26 to controlling device 21. In method step 34, the fault is then handled as presented above (FIG. 2). With message 35, an error report is transmitted to bus manager 24. With message 36, bus manager 24 then transmits the corresponding error report to database 26. Since in this example, device 23 was removed from the vehicle communication network, with message 37, all other devices are informed that precisely this has happened. Alternatively, it is possible that with message 37, bus manager 24 informs the other devices that device 23 is again running in normal operation.

In the following, it is described by way of example how the devices may be classified. In this case, a corresponding sensitivity level is assigned to the individual devices. Those devices which cannot load any drivers and are unable to perform any fault handling belong to the lowest sensitivity level. They are, for example, devices which can solely be controlled and which do not perform any control functions themselves. The next sensitivity level has devices which can load drivers, these drivers being solely standard drivers, thus no device-specific drivers. Furthermore, these devices are also unable to perform any fault handling. In the class following next are devices which are able to use and load standard drivers and device-specific drivers, but not perform any fault handling. In the last class are the devices having the highest sensitivity level. These devices are able to load all drivers and also handle faults. A device which accesses the vehicle communication network from outside and integrates itself into the vehicle communication network will not receive the fault-handling function, in order to avoid unauthorized accesses. For example, this will only be assigned to special devices which are available solely to technicians.

What is claimed is:

1. A method for handling a faulty device in a vehicle communication network, devices that are linked to the vehicle communication network being controlled with aid of device-specific drivers, the device-specific drivers being stored in a database linked to the vehicle communication network, comprising:

loading an expanded device-specific driver having diagnostic features for a first device from the database when the first device reacts in a faulty manner to a signal sent by a second device;

sending a test signal to the first device via the vehicle communication network with aid of the expanded device-specific driver; and initiating a fault-remedy measure as a function of a reaction to the test signal;

wherein:

as the fault-remedy measure, the first device is restarted by one of a second device and a further device when the first device sends an error code as a reaction to the test signal, and wherein after the restarting the first device is switched off when the first device continues to send the error code as the reaction to the test signal, when the first device is switched off, remaining devices of the vehicle communication network are informed that the first device has been switched off by a bus manager, the bus manager is installed on a device which is linked to the vehicle communication network, and the devices linked to the vehicle communication network are classified by assigning to each device a sensitivity level that controls access to other devices.

2. The method according to claim 1, further comprising:

sending a test signal a second time when the first device does not respond to the test signal;

removing the first device from the vehicle communication network as the fault-remedy measure when the first device shows no reaction to the second sending of the test signal, by marking an entry for the first device in the database as removed; and sending a signal to the first device to switch off the first device.

3. The method according to claim 2, further comprising:

informing, when the first device is switched off, remaining devices of the vehicle communication network that the first device has been switched off by a bus manager.

4. The method according to claim 1, further comprising:

restarting, as the fault-remedy measure, the first device by one of a second device and a further device when the first device sends an error code as a reaction to the test signal; and switching off the first device when, after the restarting, the first device continues to send the error code as the reaction to the test signal.

5. The method according to claim 4, further comprising:

informing, when the first device is switched off, remaining devices of the vehicle communication network that the first device has been switched off by a bus manager.

6. A device for performing a fault-remedying operation for a faulty device in a vehicle communication network, comprising:

an arrangement for loading an expanded device-specific driver having diagnostic features for a first device from a database when the first device reacts in a faulty manner to a received signal;

an arrangement for sending a test signal to the first device via the vehicle communication network with aid of the expanded device-specific driver; and an arrangement for initiating a fault-remedy measure as a function of a reaction by the first device to the test signal;

wherein:

as the fault-remedy measure, the first device is restarted by one of a second device and a further device when the first device sends an error code as a reaction to the test signal, and wherein after the restarting the first device is switched off when the first device continues to send the error code as the reaction to the test signal, when the first device is switched off, remaining devices of the vehicle communication network are informed that the first device has been switched off by a bus manager, the bus manager is installed on a device which is linked to the vehicle communication network, and the devices linked to the vehicle communication network are classified by assigning to each device a sensitivity level that controls access to other devices.

7. The device according to claim 6, wherein the first device sends an error code in response to the test signal in an event of a recognized fault.

* * * * *